Aug. 23, 1938.   M. B. CAMERON   2,128,037
MOVEMENT RESTRAINING MEANS
Filed April 8, 1937   2 Sheets-Sheet 2
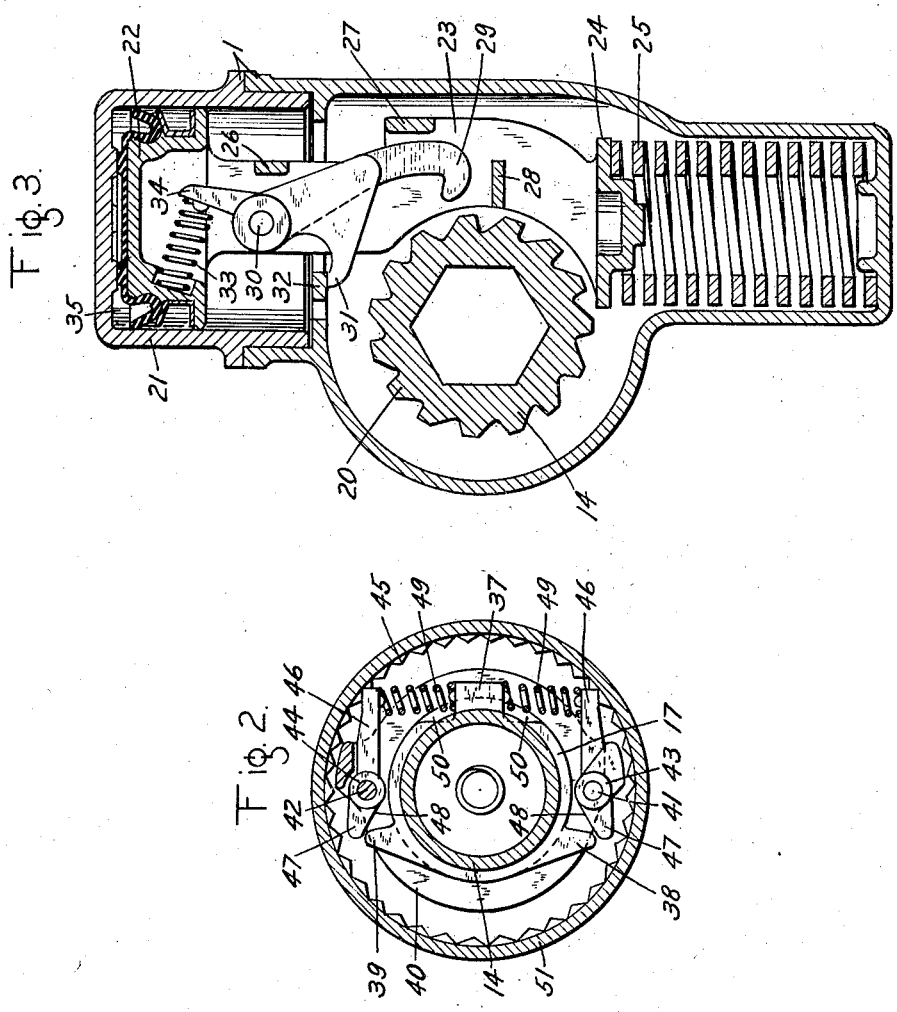
INVENTOR
MORTIMER B. CAMERON
BY
ATTORNEY Patented Aug. 23, 1938

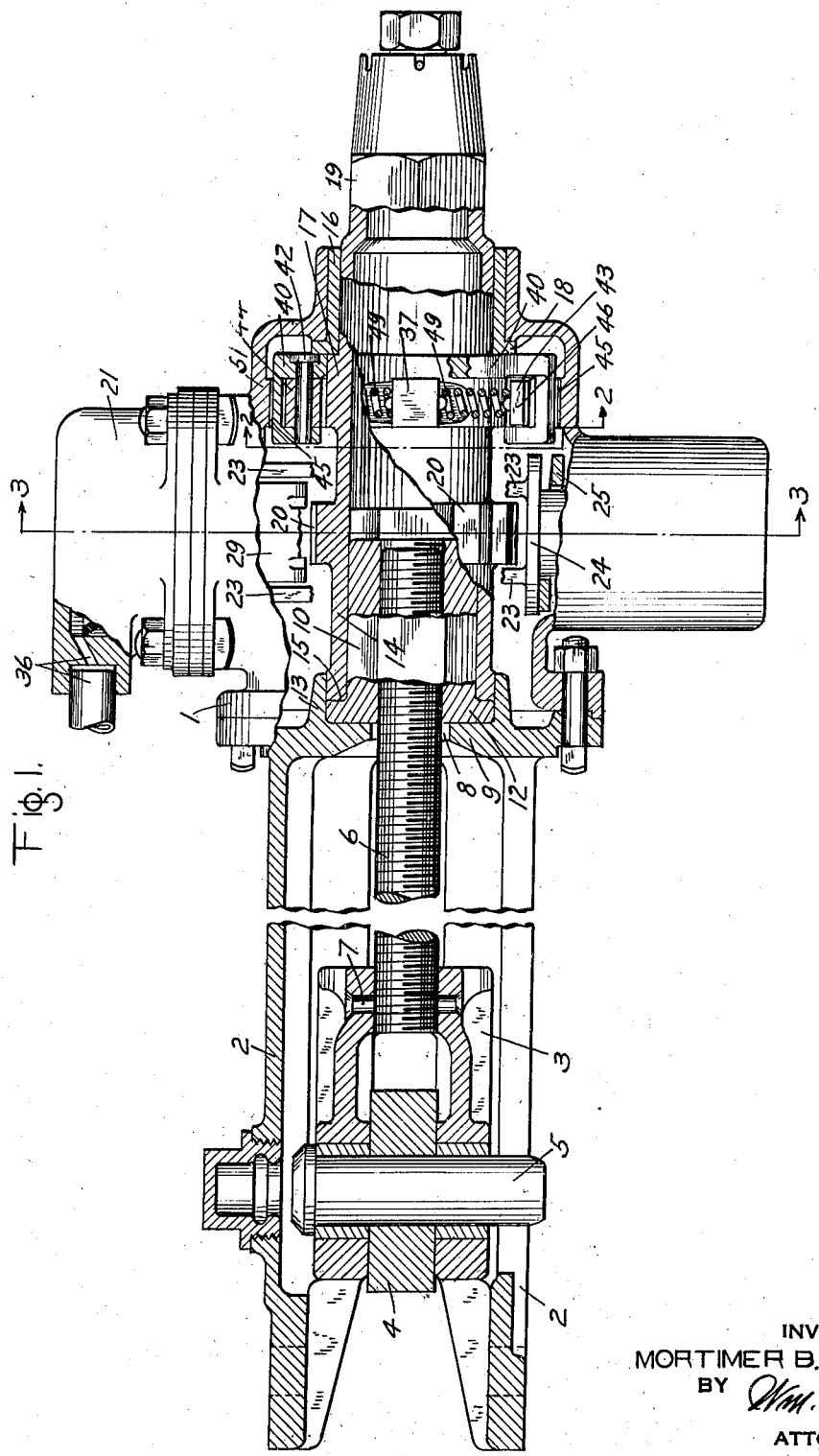

2,128,037

UNITED STATES PATENT OFFICE 2,128,037

MOVEMENT RESTRAINING MEANS

Mortimer B. Cameron, Edgewood, Pa., assignor to The Westinghouse Air Brake Company, Wilmerding, Pa., a corporation of Pennsylvania Application April 8, 1937, Serial No. 135,617

20 Claims. (Cl. 188—203)

This invention relates to motion restraining means adapted to be embodied in mechanisms in which it is desired to restrain certain operating elements against unintentional movement from their proper operating positions, which mechanisms may include slack adjusters for brake rigging and more particularly that type of slack adjuster in which a rotatable adjusting nut is employed to move a screw threaded adjusting member for either taking up or providing slack.

The principal object of the present invention is to provide an improved motion restraining means for mechanisms adapted to prevent unintentional relative movement between certain parts of the mechanisms and adapted to be rendered ineffective to prevent intentional movement of the parts.

Slack adjusters of the above mentioned type usually embody a stop or latching mechanism for restraining the adjusting mechanism against movement in a direction to provide slack in the brake rigging, but there is nothing provided for restraining the mechanism against movement in the opposite or slack take up direction, the inherent frictional resistance of the several movable parts being relied upon to prevent such movement. Under normal service shocks or vibrations to which the slack adjuster is subjected, the frictional resistance may in some instances be adequate to prevent such movement, but in other instances and under abnormal conditions it may be wholly inadequate. It is therefore possible, under the influence of such abnormal shocks or vibrations, for the mechanism to unintentionally function to decrease the slack in the brake rigging when such decrease is undesired.

It is therefore another object of the invention to provide means for restraining the adjusting mechanism of a slack adjuster against undesired movement either to increase or decrease the slack in the brake rigging.

A further object of the invention is to provide means for restraining the adjusting mechanism of the slack adjuster against undesired movement to either decrease or increase the slack in a brake rigging and to provide means for automatically controlling the restraining means to permit desired movement of the adjusting mechanism to either increase or decrease the slack in the brake rigging.

Other objects and advantages will appear in the following more detailed description of the invention.

In the accompanying drawings Fig. 1 is a side elevational view, partly in section, of a slack adjuster embodying the invention; and Figs. 2 and 3 are cross-sectional views taken along the lines 2—2 and 3—3 respectively of Fig. 1.

The restraining mechanism is shown in connection with a slack adjuster which may comprise a casing 1 having at one end spaced arms 2 which are adapted to be attached, at their outer ends, to a brake cylinder or any other desired supporting structure. Disposed between the arms 2 and movable longitudinally thereof is a crosshead 3 which is operatively connected at one end to a lever 4 by means of a pin 5, said lever being a part of the brake rigging to be adjusted. The crosshead is held against axial rotation in the usual manner by the arms 2.

For the purpose of actuating the crosshead a longitudinally movable screw-threaded member 6 is provided which has one end attached to the crosshead by means of a rivet 7 and through the medium of this connection the crosshead will prevent axial rotation of the member.

The other end of the member 6 extends through an opening 8 in the wall 9 of the casing, and beyond this wall, has screw-threaded connection with a rotatable adjusting nut 10 having a relatively short longitudinally extending annular end portion 12 which is journaled in an annular bearing 13 carried by the casing. The end face of the portion 12 slidably engages the wall 9 of the casing, which wall, in the present embodiment of the invention constitutes a thrust bearing for the nut. The nut for the remainder of its length is of hexagonal form in cross section and is telescoped by the inner end of a rotatable hollow sleeve member 14, the inner surface of the nut receiving portion of the sleeve being made to substantially conform to the shape and dimensions of the telescoped portion of the nut to provide a positive driving connection from the sleeve to the nut.

The portion 12 of the nut, as shown in Fig. 1 provides a shoulder 15 against which the left hand end of the sleeve 14 bears.

The sleeve 14 extends beyond the right hand end of the casing 1 and where it passes through the casing it is journaled in a bushing 16 mounted in the casing, the inner end of the bushing constituting a thrust bearing for the outer end face of an annular collar 17 which is preferably formed integral with the sleeve, which bushing is provided with an outwardly extending flange 18. The portion of the sleeve which projects beyond the casing is provided with an exterior nut portion 19 for engagement by a tool when it is desired to rotate the sleeve by hand.

It is to be noted that since the end of the nut 10 is in thrust engagement with the wall 9 of the casing and the end of the collar 17 is in thrust engagement with the bushing 16, the sleeve 14 is held against longitudinal endwise movement either toward the left hand or toward the right.

The sleeve 14 is provided with a ratchet wheel 20 through the medium of which the sleeve and thereby the nut 10 is adapted to be rotated by means of a fluid pressure motor comprising a cylinder 21 formed by the casing and containing a piston 22 having a stem consisting of a pair of members 23 which are spaced apart to straddle the ratchet wheel and which at their outer ends are rigidly connected together by an integral spring seat 24 cooperating with the coil spring 25 seated on the casing. The stem members 23 are also connected together by spaced bridge pieces 26, 27 and 28.

For the purpose of driving the ratchet wheel 20 a pawl 29 is provided which is disposed between the spaced piston stem members 23 and which is pivotally mounted at one end on a pin 30 located adjacent the piston 22 and carried by and bridging the space between the members. The free end of the pawl is shaped to operatively engage the teeth of the ratchet wheel. Intermediate its ends, the pawl is provided with a lug 31 which, when the piston is in its normal position as shown in Fig. 3, is in engagement with a stop 32 incorporated in the casing and which, due to such engagement maintains the pawl out of contact with the ratchet wheel against the opposing pressure of a spring 33 interposed between and engaging the piston and a lug 34 integral with and extending outwardly from the pivoted end of the pawl.

At one side of the piston 22 is a piston chamber 35 which is connected by way of a passage and pipe 36 to the usual slack adjuster port of a brake cylinder (not shown), in a well known manner, to establish communication through which fluid under pressure is adapted to flow to the piston chamber when the brake cylinder piston, in effecting an application of the brakes, uncovers the adjuster port.

The collar 17 of the sleeve 14 is provided with outwardly extending radially arranged lugs 37, 38 and 39 which are of less width than the collar so as to provide a narrow clear space between the lugs and the flange 18 of the bushing 16. Located largely within this space and rockably mounted on the collar 17 is a mechanism which normally restrains the sleeve 14 against accidental rotation in both the slack take-up and slack providing direction and which is automatically operative to permit the movement of the sleeve in either direction when the sleeve is intentionally subjected to force applied automatically or manually to rotate the sleeve as will hereinafter more fully appear.

This restraining mechanism in the present embodiment of the invention comprises an annular member 40 which is disposed in the space between the lugs and flange 18 of the bushing 16 and which is maintained in its proper position longitudinally of the sleeve by the lugs 37, 38 and 39 and flange 18. The member 40 is provided with pivot pins 41 and 42 which are located outside of the sleeve 14 and preferably diametrically opposite to each other, and pivotally mounted on these pins are latch members 43 and 44, respectively, which extend at substantially right angles to the axis of the sleeve and which are rockable in opposite directions to each other either into or out of locking engagement with the stationary radially arranged teeth 45 preferably integral with and located interiorly of an annular portion 51 of the casing.

Each of the latch members comprises an arm 46 which is located at one side of the latch pivot and which is provided with a sloping or wedge shaped inner edge surface 48 which is, for a portion of its length, within the path of travel of the outer end of either the lug 38 or the lug 39 as the case may be. The arms 46 of the latch members are each urged into engagement with the teeth 45 by means of a spring 49 which is interposed between and engages the arm and the lug 37, the collar 17 at each side of the lug 47 being provided with a recess 50 to accommodate the lug engaging end of the spring.

With the latch members 43 and 44 in engagement with the teeth 45, the lower ends of the arm 47 of the members over-lie the outer ends of the lugs 38 and 39, respectively, there being a slight clearance space between the lugs and the sloping surfaces 48 of the members. This insures against the lugs interfering with the full locking movement of the latch members.

*Automatic operation of the slack adjusters to take up slack*

Upon effecting an application of the brakes, if the travel of the brake cylinder piston exceeds the normal distance, which will be the case when there is undesired slack in the brake rigging, the brake cylinder piston will uncover the slack adjuster port to the brake cylinder piston chamber, so that fluid under pressure will flow from this chamber through pipe and passage 36 to the piston chamber 35 of the slack adjuster cylinder. Fluid under pressure then supplied to the chamber 35 causes the piston 22 and thereby the piston stem and pawl 29 to move inwardly, the spring seat 24 carried by the stem causing the spring 25 to be compressed. As the pawl 29 is thus being moved, the spring 33 interposed between the piston and the arm 34 of the pawl, acts to cause the pawl to rotate in a clockwise direction into engagement with a tooth of the ratchet wheel 20. The adjusting motor is now in condition for operation to take up slack in the brake rigging.

Upon the release of fluid under pressure from the brake cylinder to effect a release of the brakes, the brake cylinder piston in its traverse toward release position first cuts off communication between the brake cylinder piston chamber and the slack adjuster port and consequently the piston chamber 35 of the slack adjuster and then connects this port and thereby the piston chamber 35 to the non-pressure chamber of the brake cylinder which is connected in the usual manner to the atmosphere. Upon the release of fluid under pressure from the piston chamber 35, the spring 25 acts to move the piston stem, pawl 29 carried by the piston stem and piston 22 to their outer or normal position in which they are shown in Fig. 3, the pawl acting to rotate the ratchet wheel 20 and thereby the sleeve 14 and adjusting nut 10 in a counterclockwise direction, as viewed in Fig. 3. The nut 10 as it is thus rotated, due to its screw threaded connection with the member 6, causes the member and thereby the crosshead 3 and lever 4 to move a short distance toward the left hand, as viewed in Fig. 1. Thus slack which has developed in the brake rigging is automatically taken up.

It will here be noted that upon the initiation of the rotary movement of the sleeve by the pawl 29, the lug 38 on the sleeve, after moving through the clearance space between the lug and the arm 47 of the latch member 43, engages the surface 48 of the latch member and through such engagement causes the latch member to rock about the pivot pin 41 in a counterclockwise direction as view in Fig. 2, so that the end 46 of the latch member is moved out of engagement with the stationary teeth 45 carried by the casing. When the latch member 43 has been moved out of engagement with the teeth 45, the sleeve 14, as it continues to be rotated by the pawl 29, acts through the medium of the lug 38, latch member 43 and pivot pin 41 to rotate the member 40 and thereby the latch member 44 in the same direction as the sleeve is rotated, the latch 44 idling over one or more of the teeth 45 according to the degree of rotation imparted to the sleeve and to the distance between the teeth 45.

The rotary movement of the sleeve 14 is limited by the automatic operation of the pawl 29 out of engagement with the ratchet wheel 20 which operation is accomplished in the following usual manner. Before the piston 35 has reached its normal position, the stop 32 of the casing cooperates with the lug 31 of the pawl to move the pawl out of engagement with the ratchet wheel so that when the piston is in its normal position the pawl will be maintained out of engagement with the ratchet wheel as shown in Fig. 3.

It should here be observed that as the sleeve 14 is being rotated to effect the unlatching movement of the latch member 43, the spring 49 will be compressed by movement of the lug 37 relative to the latch member 44 so that when the pawl 29 is moved out of engagement with the ratchet wheel 20 this spring will act to rotate the sleeve 14 in a clockwise direction, the lug 38 of the sleeve, as it is thus being moved, permitting the spring 49, which is interposed between the lug 37 and the latch member 46, to move the latch member into locking engagement with the teeth 45. When the sleeve has been rotated in this direction a sufficient distance for the lug 38 to be free of the arm 47 of the latch member 43 the pressures of the springs 49 acting on opposite sides of the lug 37 will be equalized and the sleeve will come to a stop with the lugs 38 and 39 spaced away from the arms 47 of the latch members 43 and 44, respectively, as shown in Fig. 2.

*Manual operation of the slack adjuster to take up slack and to provide slack*

When it is desired to take up slack in the rigging manually a wrench or other suitable tool is applied to the nut portion of the sleeve and through the medium of the tool the sleeve 14 is rotated in a counterclockwise direction as viewed in Figs. 2 and 3, the lug 38 thereon engaging the latch member 43 and causing the latch member to be raised out of engagement with the teeth 45 in the same manner as when the sleeve is moved by the pawl 29 and ratchet wheel 20. When the desired adjustment has been made and the operator releases the sleeve, the sleeve will move in a clockwise direction in the same manner as has hereinbefore been described in connection with the release of the sleeve by the pawl 29 so that the lugs 38 and 39 will assume their normal positions with respect to the latch members 43 and 44, respectively.

If it is desired to provide slack in the brake rigging, as will be the case when new brake shoes are to be substituted for worn ones, the sleeves 14 will be rotated manually in a clockwise direction as viewed in Figs. 2 and 3, the lug 39 of the sleeve engaging and actuating the latch member 44 out of engagement with the teeth 45, the lug 37 compressing the spring 49 interposed between this lug and the latch member 43. Upon continued rotation of the sleeve 14 after the latch member 44 is moved out of engagement with the teeth 45, the lug 39, acting through the medium of the latch 44 and the pivot pin 42, causes the member 30 and latch member 43 to be rotated as a unit in the same direction, the latch member 43 idling over the teeth 45 until such time as the desired slack has been provided, or in other words, until the operator ceases to rotate the sleeve. When the sleeve 14 is relieved of manual pressure the spring 49 interposed between the lug 37 and latch member 43 acts to rotate the sleeve in a counterclockwise direction relative to the member 40 so that the lug 39 will be moved away from the latch member 44 and permit the spring 49 interposed between the lug 37 and the latch member 44 to move the latch member into engagement with the teeth 45.

*General consideration*

It will be noted that since the latch member 43 normally restrains the member 40 against rotation relative to the casing in a counterclockwise direction as viewed in Fig. 2 and the latch member 44 normally restrains the member 40 against rotation in the opposite direction, the springs 49 acting through the medium of the latch member will prevent the accidental rotation of the sleeve in either direction.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a mechanism, in combination, a stationary part, an element selectively movable in either of two directions relative to said part, and means cooperating with said part and element for preventing unintentional movement of said element in either direction and automatically movable out of such cooperative relationship upon intentional movement of said element.

2. In a mechanism, in combination, a stationary part, an element selectively movable in either of two directions relative to said part, and means cooperating with said part and element for preventing unintentional movement of said element in either direction, and means carried by said element for automatically moving the movement preventing means out of cooperative relationship with said stationary part upon intentional movement of the element.

3. In a mechanism, in combination, a stationary part, an element selectively movable in either of two directions relative to said part, and means carried by said element and cooperating with the element and said part for preventing unintentional movement of the element and being automatically movable out of cooperative relationship with said part upon intentional movement of the element.

4. In a mechanism, in combination, a stationary part, an element selectively movable in either of two directions relative to said part, and means rockably mounted on said element and cooperating with the element and said part for preventing movement of the element as long as a force applied to the element and tending to operate the element does not exceed a predetermined magnitude and automatically movable out of such cooperative relationship with said part when the operating force applied to the element exceeds said predetermined magnitude.

5. In a mechanism, in combination, a stationary part, an element adapted to be selectively driven in either of two directions relative to said stationary part, means cooperating with said stationary part and element for normally opposing movement of said element in either direction, the opposing force of said means being of sufficient magnitude to prevent accidental movement of the element under all conditions of service, and means operative automatically for rendering the opposing means ineffective to oppose movement of the element upon applying an operating force to said element in excess of said opposing force.

6. In a mechanism, in combination, a stationary part, an element adapted to be selectively driven in either of two directions relative to said stationary part, means cooperating with said stationary part and element for normally opposing movement of said element in either direction, the opposing force of said means being of sufficient magnitude to prevent accidental movement of the element under all conditions of service, and means on said element for automatically rendering the opposing means ineffective to oppose movement of the element upon applying an operating force to said element in excess of said opposing force.

7. In a mechanism, in combination, a stationary part, an element rotatable relative to said part, means for opposing rotation of said element, said means comprising a rotatable member, locking means carried by said member and normally engaging said part to lock the member against rotation, resilient means coacting with said locking means and to actuate the locking means out of locking engagement with said part, and means on said element adapted upon rotation of the element to engage said locking means and to actuate the locking means out of locking engagement with said part when the operating force applied to said element is in excess of the opposing force of said resilient means acting through the locking means.

8. In a mechanism, in combination, a stationary part, an element rotatable relative to said part, means for opposing rotation of said element, said means comprising a rotatable member, locking means carried by said member and normally engaging said part to lock the member against rotation, resilient means coacting with said locking means and element to oppose movement of the locking means out of locking engagement with said part, and means on said element adapted upon rotation of the element to engage said locking means and to actuate the locking means out of locking engagement with said part when the operating force applied to said element is in excess of the opposing force of said resilient means acting through the locking means, the means for opposing rotation of said element being rotatable with the element when the locking means is out of locking engagement with said part.

9. In a mechanism, in combination, a stationary part, an element rotatable relative to said part, means for opposing rotation of said element, said means comprising a member carried by said element and having a lost motion connection therewith for at times permitting the element to rotate a limited distance relative thereto, locking means coacting with said part and element for locking said member against rotation by the element, and means carried by the element operative upon rotation of the element a predetermined distance relative to the member for moving said locking means out of locking engagement with said part.

10. In a mechanism, in combination, a stationary part, an element rotatable relative to said part, means for opposing rotation of said element, said means comprising a member carried by said element and having a lost motion connection therewith for at times permitting the element to rotate a limited distance relative thereto, locking means coacting with said part and element for locking said member against rotation by the element, means operative upon rotation of said element a predetermined distance relative to the member for moving said locking means out of locking engagement with said part, and means opposing the operation of the locking means.

11. In a mechanism, in combination, a stationary part, an element rotatable relative to said part, means for opposing rotation of said element, said means comprising a member carried by said element and having a lost motion connection therewith for at times permitting the element to rotate a limited distance relative thereto, locking means coacting with said part and element for locking said member against rotation by the element, means operative upon rotation of said element a predetermined distance relative to the member for moving said locking means out of locking engagement with said part, and means interposed between and engaging said locking means and element for opposing the operation of the locking means.

12. In a mechanism, in combination, a stationary part, an element rotatable relative to said part, means for opposing rotation of said element, said means comprising a member carried by said element and having a lost motion connection therewith for at times permitting the element to rotate a limited distance relative thereto, locking means coating with said part and element for locking said member against rotation by the element, means operative upon rotation of said element a predetermined distance relative to the member for moving said locking means out of locking engagement with said part, and a spring interposed between and engaging said locking means and element for opposing the operation of the locking means.

13. In a mechanism, in combination, a stationary part, an element rotatable relative to said part, means for opposing rotation of said element, said means comprising a member carried by said element and having a lost motion connection therewith for at times permitting the element to rotate a limited distance relative thereto, locking means coacting with said part and element for locking said member against rotation by the element, means operative upon rotation of said element a predetermined distance relative to the member for moving said locking means out of locking engagement with said part, and means interposed between and engaging said locking means and element for opposing the operation of the locking means and for moving said locking means into locking engagement with said part upon the relief of operating force on said element.

14. In a slack adjuster for brake rigging, in combination, a member movable in one direction to take up slack and movable in the opposite direction to provide slack, an element operable to move said member in either direction, and means restraining the element against accidental operation and being automatically movable out of restraining relationship with the element upon the intentional movement of the element.

15. In a slack adjuster for brake rigging, in combination, a member movable in one direction to take up slack and movable in the opposite direction to provide slack, an element operable to move said member in either direction, means restraining the element against accidental operation and being automatically movable out of restraining relationship with the element upon the intentional movement of the element, and means carried by the element for actuating the restraining means.

16. In a slack adjuster for brake rigging, in combination, a member movable in one direction to take up slack and movable in the opposite direction to provide slack, an element operable to move said member in either direction, and means restraining the element against accidental operation and being automatically movable out of restraining relationship with the element upon initiation of intentional movement of the element.

17. In a slack adjuster for brake rigging, in combination, mechanism operable to take up or provide slack in the rigging, means normally holding said mechanism against accidental movement to either take up or provide slack and being automatically operable out of holding relationship with said mechanism upon intentional movement of the mechanism.

18. In a slack adjuster for brake rigging, in combination, a casing, mechanism mounted in said casing operable to either take up or provide slack in the rigging, restraining means cooperating with said casing and mechanism for holding the mechanism against accidental operation to either take up or provide slack, and means included in said mechanism adapted to render said restraining means ineffective to hold said mechanism against operation upon the intentional movement of the mechanism to adjust the slack in the rigging.

19. In a slack adjuster for brake rigging, in combination, a casing, mechanism mounted in said casing operable to either take up or provide slack in the rigging, restraining means cooperating with said casing and mechanism for holding the mechanism against accidental operation to either take up or provide slack, and means included in said mechanism adapted to render said restraining means ineffective to hold said mechanism against operation upon the intentional movement of the mechanism to adjust the slack in the rigging, said restraining means being movable with said mechanism during the subsequent intentional adjusting movement of the mechanism.

20. In a slack adjuster for brake rigging, in combination, a casing, an adjusting element journalled in said casing and rotatable in one direction to take up slack in the brake rigging and rotatable in the opposite direction to provide slack in the brake rigging, means cooperating with said casing and adjusting element and carried by the element for opposing rotation of the element in either direction, and means on said element adapted only upon applying a predetermined operating force to said element for actuating the rotation opposing means out of opposing relationship with the element.

MORTIMER B. CAMERON.

CERTIFICATE OF CORRECTION.

Patent No. 2,128,037.                                         August 23, 1938.

MORTIMER B. CAMERON.

It is hereby certified that error appears in the printed specification of the above numbered patent requiring correction as follows: Page 4, first column, line 43, claim 7, for the words "to actuate" read element to oppose movement of; line 45, same claim, strike out "meant with said part"; and that the said Letters Patent should be read with this correction therein that the same may conform to the record of the case in the Patent Office.

Signed and sealed this 26th day of September, A. D. 1939.

(Seal)

Henry Van Arsdale,
Acting Commissioner of Patents.